US008055646B2

(12) United States Patent
Augenstein et al.

(10) Patent No.: US 8,055,646 B2
(45) Date of Patent: Nov. 8, 2011

(54) PREVENTION OF REDUNDANT INDEXES IN A DATABASE MANAGEMENT SYSTEM

(75) Inventors: Oliver Augenstein, Weil im Schoenbuch (DE); Namik Hrle, Boeblingen (DE); Thomas Ritter, Herrenberg (DE); Andreas Uhl, Gaeufelden-Nebringen (DE)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 12/185,847

(22) Filed: Aug. 5, 2008

(65) Prior Publication Data
US 2010/0036864 A1 Feb. 11, 2010

(51) Int. Cl.
*G06F 7/00* (2006.01)
*G06F 17/30* (2006.01)
(52) U.S. Cl. ........................ 707/711; 707/741
(58) Field of Classification Search ......................... None
See application file for complete search history.

(56) References Cited

U.S. PATENT DOCUMENTS

| 5,860,066 | A | * | 1/1999 | Rouse ........................... 705/301 |
| 7,047,231 | B2 | | 5/2006 | Grasshoff et al. |
| 2003/0167255 | A1 | | 9/2003 | GraBhoff et al. |
| 2004/0015478 | A1 | * | 1/2004 | Pauly ................................ 707/1 |
| 2006/0085484 | A1 | | 4/2006 | Raizman et al. |

* cited by examiner

*Primary Examiner* — Jay Morrison
*Assistant Examiner* — Thomas Meng
(74) *Attorney, Agent, or Firm* — Francis Lammes; Stephen J. Walder, Jr.; Jeffrey S. LaBaw

(57) ABSTRACT

A method and system for preventing redundant indexes in a database management system (DBMS). A received create-index command specifies a new index to be created for retrieving data from a table created by the DBMS and a redundancy check to be performed for the new index in conjunction with an action parameter in the create-index command. If the action parameter includes a REPORT value, each redundant index is stored and/or displayed and the new index is created. If the action parameter includes a PREVENT value and an existing index is redundant in view of the new index and the new index is not redundant in view of the existing index, the existing index is deleted and the new index is created. If the action parameter includes a PREVENT value and the new index is redundant in view of an existing index, the new index is not created.

16 Claims, 2 Drawing Sheets

PREVENTION OF REDUNDANT INDEXES IN A DATABASE MANAGEMENT SYSTEM

FIELD OF THE INVENTION

The present invention provides a method and system for preventing redundant indexes in a database management system (DBMS).

BACKGROUND OF THE INVENTION

A Database Management System (DBMS) comprises software that controls the organization, storage, retrieval, security and integrity of data in a database. The DBMS accepts requests from an application and instructs the operating system of a computer system to store, retrieve, and manipulate data.

A DBMS index is a data structure based on a database table and is used for locating data quickly within the table. Indexes are defined by selecting a set of commonly searched attribute(s) on a table. A platform-specific mechanism is used to create an index.

In the absence of an index, a database query searches every row of a table to find data specified by the query. For example, the table may store information about employees and a search for employees by last name may result in slow query responses. Defining an index consisting of the last name may speed up these queries.

If multiple indexes have been defined, some indexes may be not be useful for serving their intended purposes in light of other defined indexes which can be adequately used to serve such intended purposes. However, current DBMS software does not efficiently manage indexes so as to reduce or eliminate indexes that are not likely to be useful.

Accordingly, there is a need DBMS software to efficiently manage indexes so as to reduce or eliminate indexes that are not likely to be useful.

SUMMARY OF THE INVENTION

The present invention provides a method for preventing redundant indexes in a database management system (DBMS), said method implemented by execution of the DBMS on a processor of a computer system that includes data storage media, said method comprising:

receiving a create-index command that specifies a new index to be created for retrieving data from a table created by the DBMS, said create-index command specifying a redundancy check to be performed for the new index in conjunction with an action parameter in the create-index command, said action parameter comprising a REPORT value or a PREVENT value, said storage media storing the table and an index database comprising a set of existing indexes, each existing index being a data structure configured to retrieve data from the table;

responsive to said receiving the create-index command, determining at least one redundant index selected from the group consisting of the new index, the set of existing indexes, and a combination thereof;

responsive to said to said determining at least one redundant index, ascertaining whether the action parameter comprises the REPORT value or the PREVENT value;

if said ascertaining ascertains that the action parameter comprises the REPORT value, then storing and/or displaying the determined at least one redundant index, creating the new index, and incorporating the new index in the index database;

if said ascertaining ascertains that the action parameter comprises the PREVENT value and if each existing index is redundant in view of the new index and the new index is not redundant in view of each existing index, then deleting each existing index from the index database, creating the new index, and incorporating the new index in the index database;

if said ascertaining ascertains that the action parameter comprises the PREVENT value and if the new index is redundant in view of each existing index, then inhibiting creation of the new index which results in the index database not comprising the new index.

The present invention provides a computer program product, comprising a computer usable storage medium having a computer readable program code stored therein, said computer readable program code comprised by a database management system (DBMS) and containing instructions that when executed by a processor of a computer system implement a method for preventing redundant indexes in the DBMS, said computer system including data storage media, said method comprising:

receiving a create-index command that specifies a new index to be created for retrieving data from a table created by the DBMS, said create-index command specifying a redundancy check to be performed for the new index in conjunction with an action parameter in the create-index command, said action parameter comprising a REPORT value or a PREVENT value, said storage media storing the table and an index database comprising a set of existing indexes, each existing index being a data structure configured to retrieve data from the table;

responsive to said receiving the create-index command, determining at least one redundant index selected from the group consisting of the new index, the set of existing indexes, and a combination thereof;

responsive to said determining at least one redundant index, ascertaining whether the action parameter comprises the REPORT value or the PREVENT value;

if said ascertaining ascertains that the action parameter comprises the REPORT value, then storing and/or displaying the determined at least one redundant index, creating the new index, and incorporating the new index in the index database;

if said ascertaining ascertains that the action parameter comprises the PREVENT value and if each existing index is redundant in view of the new index and the new index is not redundant in view of each existing index, then deleting each existing index from the index database, creating the new index, and incorporating the new index in the index database;

if said ascertaining ascertains that the action parameter comprises the PREVENT value and if the new index is redundant in view of each existing index, then inhibiting creation of the new index which results in the index database not comprising the new index.

The present invention provides a computer system comprising a processor and a computer readable memory unit coupled to the processor, said memory unit containing computer readable program code comprised by a database management system (DBMS) and containing instructions that when executed by a processor of a computer system implement a method for preventing redundant indexes in the DBMS, said computer system including data storage media, said method comprising:

receiving a create-index command that specifies a new index to be created for retrieving data from a table created by the DBMS, said create-index command specifying a redundancy check to be performed for the new index in conjunction with an action parameter in the create-index command, said action parameter comprising a REPORT value or a PRE- VENT value, said storage media storing the table and an index database comprising a set of existing indexes, each existing index being a data structure configured to retrieve data from the table;

responsive to said receiving the create-index command, determining at least one redundant index selected from the group consisting of the new index, the set of existing indexes, and a combination thereof;

responsive to said to said determining at least one redundant index, ascertaining whether the action parameter comprises the REPORT value or the PREVENT value;

if said ascertaining ascertains that the action parameter comprises the REPORT value, then storing and/or displaying the determined at least one redundant index, creating the new index, and incorporating the new index in the index database;

if said ascertaining ascertains that the action parameter comprises the PREVENT value and if each existing index is redundant in view of the new index and the new index is not redundant in view of each existing index, then deleting each existing index from the index database, creating the new index, and incorporating the new index in the index database;

if said ascertaining ascertains that the action parameter comprises the PREVENT value and if the new index is redundant in view of each existing index, then inhibiting creation of the new index which results in the index database not comprising the new index.

The present invention provides DBMS software to efficiently manage indexes so as to reduce or eliminate indexes that are not likely to be useful.

DETAILED DESCRIPTION OF THE INVENTION

Figure 2:
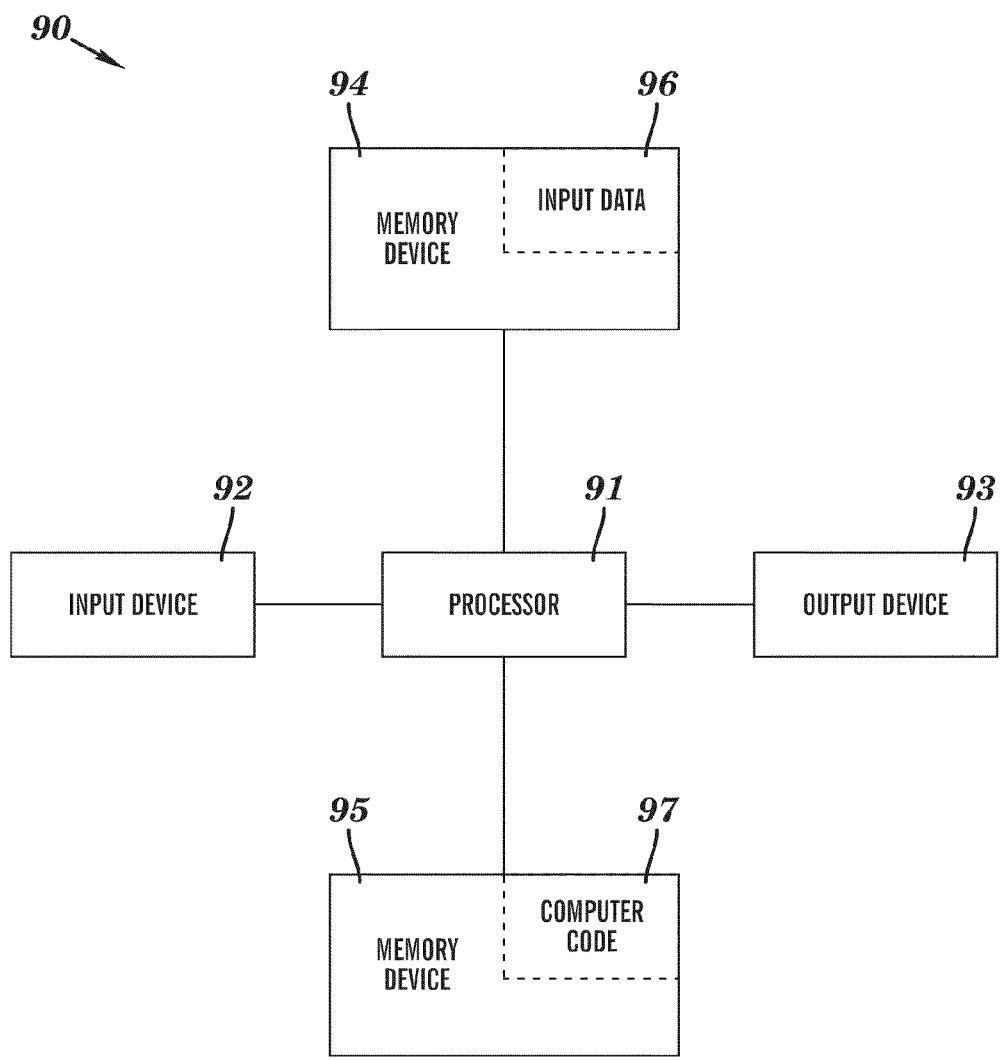
FIG. 2 illustrates a computer system used for preventing redundant indexes in a database management system (DBMS), in accordance with embodiments of the present invention.

The present invention may be implemented via execution of a Database Management System (DBMS) on a computer system such as the computer system 90 of FIG. 2, described infra. The DBMS is stored in computer readable media of the computer system.

The DBMS comprises a plurality of tables. An index of the DBMS is a data structure defined with respect to a table of the plurality of tables. The index is configured to facilitate retrieving data from the table, and efficient ordering of access to records of the table, through use of commands or statements in a database query language. Although the examples discussed herein are presented as commands or statements in Structured Query Language (SQL), the scope of the present invention includes use of any applicable database query language. The present invention may be implemented through incorporation of the subject matter of the present invention into any applicable DBMS software such as, inter alia, ORACLE (by Oracle Corporation), DB2 (by International Business Machines Corporation), SQL Server (by Microsoft Corporation), etc., or into any new DBMS software developed for and/or in conjunction with the present invention.

An index comprises of a set of keys, wherein each key represents a single column ("singular key") or a plurality of columns ("composite key") of the table. The data structure of the key may be any index data structure known by a person of ordinary skill in the art such as, inter alia, a B+Tree, R-tree, hash table, bitmap index, etc. Usage of such index data structures for managing and using table indexes is well known in the art.

The DBMS optimizer automatically chooses the most efficient way to access data in tables. Thus, the DBMS optimizer takes indexes into consideration when determining the fastest access path to data. Indexes are used by the database manager to improve query performance and ensure uniqueness of table data. The indexes are stored in an index database residing on computer readable media of the computer system.

Different indexes of a table may consist of an identical set of table columns, whereas the sequential order of the columns of an index key plays an important role. A "prefix" of an index key is defined as one or more initial consecutive columns of the index key. For example, if a table consists of columns A, B, C, D, E, F, G, H, and if an index key of the table consists of A, C, D, H, then the index key comprises four prefixes, namely a first prefix (A), a second prefix (A, C), a third prefix (A, C, D), and a fourth prefix (A, C, D, H).

If a key of a new index is a prefix of a key of an already existing index with the same sequential ordering of columns, then there may not be much value in creating the new index. Similarly, if an already existing index comprises a key that is a prefix of a key of the new index, then there may not be much value of retaining the already existing index. Such indexes not having much value are examples of "redundant indexes" that may be beneficially not created or retained.

A formal definition of an index $I_1$ being redundant in view of index $I_2$ is as follows. Given a table T consisting of k columns $C_1, \ldots, C_k$ ($k \geq 2$), and given two indexes, $I_1$ and $I_2$, based on T, index $I_1$ comprising index key $K_1 = \{C_1, \ldots, C_i\}$ and index $I_2$ comprising index key $K_2 = \{C_1, \ldots, C_j\}$ subject to $i \leq j \leq k$, index $I_1$ is redundant in view of index $I_2$ if $K_1$ is a prefix of $K_2$ which requires that:

the set of columns $C_1, \ldots, C_i$ of $K_1$ is a subset of the columns $C_1, \ldots, C_j$ of $K_2$; and the sequential order of columns $C_1, \ldots, C_i$ of $K_1$ is identical to the sequential order of the columns $C_1, \ldots, C_i$ of $K_2$.

Definitionally, an index is defined to be "redundant" if the index is redundant in view of another index in accordance with the preceding definition of an index $I_1$ being redundant in view of index $I_2$.

Consider the following scenario in which the SQL "select" and "create index" commands are used. A database table 'Customer' comprises the columns cno, lname, ..., phone as depicted in Table 1.

TABLE 1

| Customer | |
|---|---|
| cno | INTEGER |
| lname | VARCHAR(30) |
| fname | VARCHAR(30) |
| country | VARCHAR(30) |
| city | VARHCAR(30) |
| zip | INTEGER |
| address | VARHCAR(50) |
| phone | VARCHAR(20) |

Based on the table 'Customer', the SQL query Q1 in Table 2 is created to collect base customer information:

TABLE 2

Q1:

```
select cno, lname, fname, country
from    Customer
where   lname =:lname
        and
        fname =:fname
order by country
```

Due to a large set of customer data (e.g., encompassing more than 1,000,000 rows of data), an index I1 comprising a composite key (see Table 3) may speed up access to data using the query Q1.

TABLE 3

I1:

create index I1 on Customer (lname, fname, country)

Further, another SQL query Q2 based on table 'Customer' is created to collect more specific customer information (see Table 4).

TABLE 4

Q2:

```
select cno, lname, fname, country, city, phone
from    Customer
where   lname =:lname
        and
        fname =:fname
        and
        country =:country
        and
        zip =:zip
```

Similar to Q1, the query response time of Q2 may also profit from an index. Since the existing index I1 is not optimal in view of overall query costs, an additional index I2 comprising a composite key (see Table 5) may speed up Q2 more efficiently.

TABLE 5

I2:

create index I2 on Customer (lname, fname, country, zip)

Index I1 is redundant in view of index I2, because the index key of I1 (lname, fname, country) is a prefix of the index key of I2 (lname, fname, country, zip). Note that the sequential order of columns (lname, fname, country) of the index key of I1 is identical to the sequential order of columns (lname, fname, country) of the index key of I2 as required in the preceding definition of an index I1 being redundant in view of an index I2. Thus, a DBMS optimizer can choose index I2 for the query access path calculation for the SQL query Q2 as well as for Q1. Index I1 becomes more or less idle in view of determining a fast access path to the data. Nevertheless, index I1 requires extra system resources for maintenance.

Index I1 can be deleted at any point in time to eliminate the redundancy. However, the present invention detects index redundancies early; i.e., when a command to create an index is processed. The present invention utilizes information about existing indexes known by the DBMS (e.g., in system tables) and the functionality to create indexes which is under control of the DBMS, to implement an enhanced DBMS index creation workflow embedded in an 'create-index' command, wherein the DBMS is able to detect index redundancies.

The new 'create-index' workflow requires enhancements regarding: how the external interface (i.e., user interface) can be used by a user to activate the index redundancy check; and how the DBMS detects and handles index redundancies.

The index redundancy check is externalized to the user by an additional option in a "create-index" command which is embodied in SQL by the "create index" command and is generally embodied in whatever command is used by the query language to create an index for columns of a table. The additional option in the create-index command is a 'redundancy check' option, which may be include an action parameter comprising a REPORT value, a PREVENT value, or a NO value as follows.

If the action parameter comprises the REPORT [<output>] value, then the new index will be created in any case and a message comprising the name(s) of redundant new and/or existing indexes may accompany the create-index completion. It is possible to write the messages to a file (<output>) if one is specified. If (<output>) is not specified, then the message may be written to standard output (STDOUT) instead. In one embodiment, <output> may specify that each redundant index is stored in a computer readable storage medium of the computer system and/or displayed in a display device of the computer system.

If the action parameter comprises the PREVENT [WITHOUT PROMPTING] value and if an existing index is found to be redundant in view of the new index, then the new index will be created. The existing redundant index will be deleted after it has been confirmed that the new index has been successfully created. In contrast, if no existing redundant index in view of the new index is found, and if the new index is found to be redundant in view of an existing index, then the new index is will not be created.

The PREVENT value may have an associated prompting requirement. In one embodiment, if 'WITHOUT PROMPTING' is specified for the PREVENT value and if an existing index is found to be redundant in view of the new index, then the redundant existing index will deleted, and the new index will be created, without any user intervention. If 'WITHOUT PROMPTING' is not specified for the PREVENT value, then the user is prompted to authorize each delete index and create index operation.

In an alternative embodiment, PREVENT [WITH PROMPTING] can be used instead of PREVENT [WITHOUT PROMPTING]. In this alternative embodiment, if 'WITH PROMPTING' is specified for the PREVENT value and if an existing index is found to be redundant in view of the new index, then the user is prompted to authorize each delete index and create index operation. If 'WITH PROMPTING' is not specified for the PREVENT value, then the redundant existing index will deleted, and the new index will be created, without any user intervention.

If the action parameter comprises the NO value, then no checks for redundant indexes are performed.

In one embodiment the REPORT value is the default value of the action parameter. In one embodiment the PREVENT value is the default value of the action parameter. In one embodiment the NO value is the default value of the action parameter.

Table 6 describes a "create index" embodiment of the create-index command for the present invention.

TABLE 6

CREATE INDEX index_name
ON table_name (column 1,...,column n)
REDUNDANCY CHECK
{REPORT [<file>] |
PREVENT [WITHOUT PROMPTING] |
NO}

In one embodiment if the 'REDUNDANCY CHECK' option is not explicitly specified, then the option 'REDUNDANCY CHECK REPORT' may be used as the default to communicate potential index duplicates.

In one embodiment, a set of existing indexes exist when the "create-index" command is received and processed, as illustrated in the following example.

Consider a table T comprising the 7 columns of A, B, C, D, E, F, G. Assume that a first existing index IE1 comprises the key {A, C, D} and a second existing index IE2 comprises the key {A, C, E}.

Consider a new index INEW1 comprising the key {A, C}, which is redundant in view of both IE1 and IE2, because the new index INEW1 is a prefix of both IE1 and IE2.

Consider a new index INEW2 comprising the key {A, C, D, E, G}. The existing index IE1 is redundant in view of the new index INEW2, because existing index IE1 is a prefix of new index INEW2. The existing index IE2 is not redundant in view of the new index INEW2, because existing index IE2 is not a prefix of new index INEW2.

Consider that a third existing index IE3 comprises the key {A, C, D, E}. Note that existing index IE1 is redundant in view of existing index IE3. In addition, existing indexes IE1 and IE3 are each redundant in view of new index INEW2. Thus, although the methodology of the present invention determines whether a new index created via a create-index command is redundant in view of one or more existing indexes, the present invention comprises embodiments in which an existing index is redundant in view of one or more other existing indexes.

Figure 1:
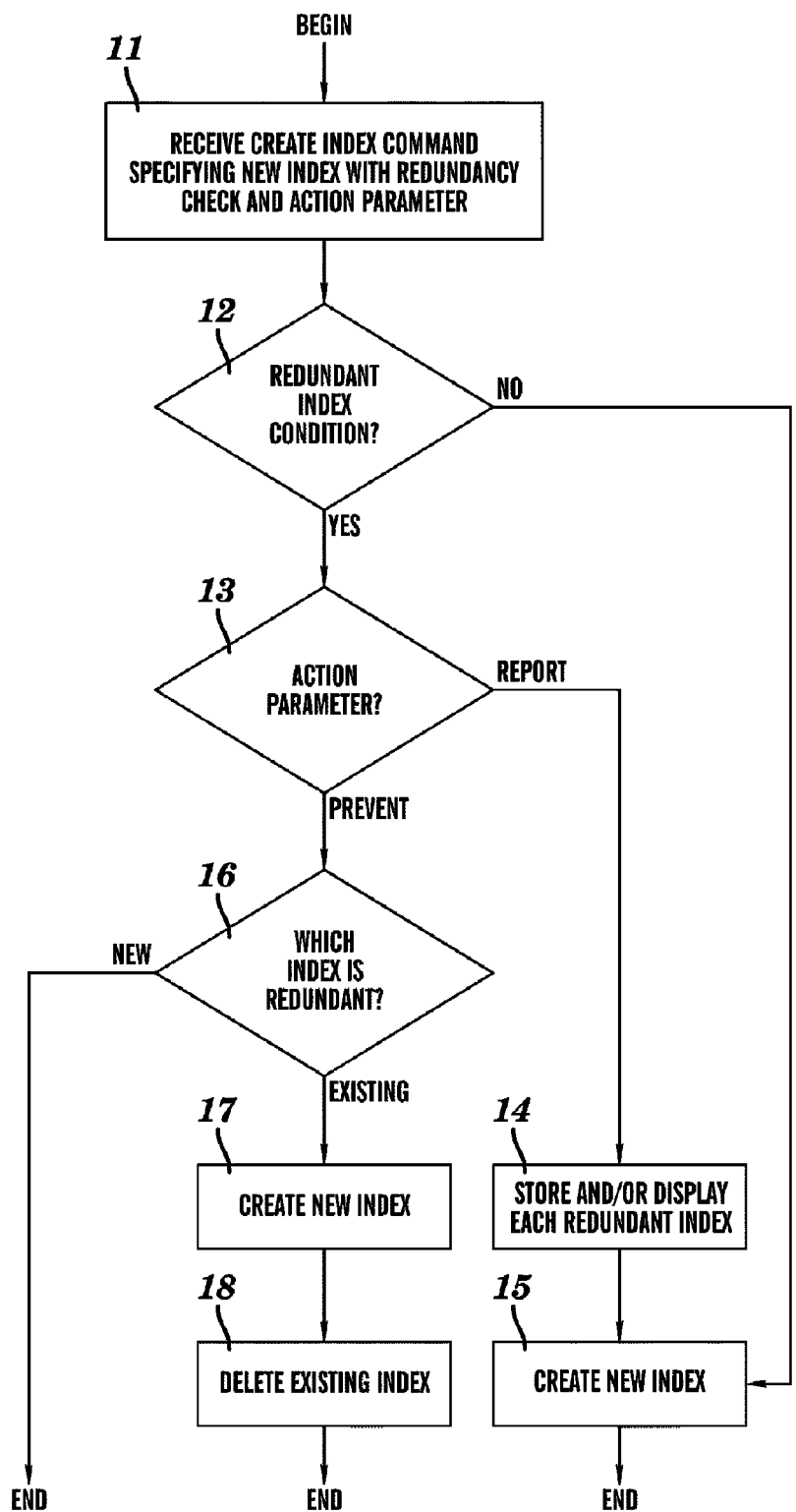
FIG. 1 is a flow chart describing a method for preventing redundant indexes in a database management system (DBMS), in accordance with embodiments of the present invention.

FIG. 1 is a flow chart describing a method for preventing redundant indexes in a database management system (DBMS), in accordance with embodiments of the present invention. The method comprises executing the DBMS on a processor of a computer system (e.g., the computer system 90 of FIG. 2). The computer system comprises data storage media that is computer readable. The storage media stores a plurality of tables created by the DBMS and an index database. The index database comprises indexes which are configured to retrieve data from the plurality of tables. Each index is a data structure defined with respect to columns of a specified table of the plurality of tables. Executing the DBMS comprises executing steps 11-18.

Step 11 receives a create-index command that specifies a new index to be created for retrieving data from a table created by the DBMS. The create-index command specifies a redundancy check to be performed for the new index in conjunction with an action parameter in the create-index command. The action parameter comprises a REPORT value or a PREVENT value. The storage media stores the table and an index database comprising a set of existing indexes. The set of existing indexes is stored in the index database during performance of said receiving the create-index command. Each existing index is a data structure configured to retrieve data from the table. In one embodiment, the set of existing indexes consists of a single existing index. In one embodiment, the set of existing indexes consists of a plurality of existing indexes.

Although the action parameter could alternatively comprise a NO value as explained supra, the flow chart of FIG. 1 assumes that the action parameter does not comprise the NO value and thus describes scenarios in which the action parameter comprises either the REPORT value or the PREVENT value.

Step 12 determines whether a redundant index condition exists. The redundant index condition is that at least one redundant index exists, wherein the at least one redundant index is the new index, each existing index of the set of existing indexes, and a combination thereof. The combination thereof corresponds to a scenario in which $K_1 = K_2$ (i.e., i=j) in the aforementioned formal definition of an index $I_1$ being redundant in view of index $I_2$.

If step 12 determines that the redundant index condition does not exist, then step 17 creates the new index and incorporates the created new index in the index database and then the process of FIG. 1 ends. If step 12 determines that the redundant index condition exists (which includes determination of the at least one redundant index), step 13 is next executed.

Step 13 determines whether the action parameter comprises the REPORT value or the PREVENT value.

If step 13 determines that the action parameter comprises the REPORT value, then step 14 stores each redundant index (determined in step 12) in the computer readable storage of the computer system (e.g., in a specified file or in STDOUT) and/or displays each redundant index in a display device of the computer system. Then step 15 creates the new index and incorporates the created new index within the index database. Step 14 may be executed either before or after step 15. Then the process of FIG. 1 ends.

If step 13 determines that the action parameter comprises the PREVENT value, then step 16 is next executed.

Using the results of step 12, step 16 determines which index (or indexes) is redundant. That is, step 16 determines that EITHER each existing index of the set of existing indexes is redundant in view of the new index and the new index is not redundant in view of each existing index of the set of existing indexes OR the new index is redundant in view of each existing index of the set of existing indexes.

If step 16 determines that each existing index of the set of existing indexes is redundant in view of the new index and the new index is not redundant in view of each existing index of the set of existing indexes, then step 17 creates the new index and incorporates the created new index in the index database. After it has been confirmed that the new index was successfully created in step 17, step 18 deletes each existing index of the set of existing indexes that existed just prior to the creation of the new index). Then the process of FIG. 1 ends.

If the PREVENT value has an associated prompting requirement (e.g., if 'WITHOUT PROMPTING' is not specified for the PREVENT value as discussed supra), then the user is prompted for authorization to perform creating the new index and incorporating the created new index in the index database in step 17, and to perform deleting each existing index of the set of existing indexes in step 18. After such authorization is received from the user, steps 17 and 18 are performed as indicated.

If step 16 determines that the new index is redundant in view of each existing index of the set of existing indexes, then creation of the new index in step 17 is inhibited, which results in the index database comprising the set of existing indexes and not comprising the new index. Then the process of FIG. 1 ends.

If the new index is redundant in view of each existing index, then creation of the new index in step 17 is inhibited even if each existing index is redundant in view of the new index. The condition of the new index being redundant in view of each existing index and the condition of each existing index being redundant in view of the new index can both be satisfied only if the new index is identical to each existing index, which corresponds to the case of $K_1=K_2$ (i.e., i =j) in the aforementioned formal definition of an index $I_1$ being redundant in view of index $I_2$.

The present invention advantageously affects the overall transactional performance of the DBMS as well as consumption of system resources and effort for DBMS administrative tasks. For example, the present invention: speeds up of inserts, updates and deletes of table records (reduced index maintenance); reduces overhead of query access plan calculation; reduces logging activities (fewer log files); reduces backup, restore and recovery time (smaller backup images to store/transfer, fewer log files to apply); reduces memory and disk storage consumption; reduces table and index reorganization effort; etc.

FIG. 2 illustrates a computer system 90 used for preventing redundant indexes in a database management system (DBMS), in accordance with embodiments of the present invention. The computer system 90 comprises a processor 91, an input device 92 coupled to the processor 91, an output device 93 coupled to the processor 91, and memory devices 94 and 95 each coupled to the processor 91. The processor 91 is a processing unit such as a central processing unit (CPU). The input device 92 may be, inter alia, a keyboard, a mouse, etc. The output device 93 may be, inter alia, a printer, a plotter, a display device (e.g., a computer screen), a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes an algorithm for preventing redundant indexes in a database management system (DBMS). The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 2) may be used as a computer usable storage medium (or program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

While FIG. 2 shows the computer system 90 as a particular configuration of hardware and software, any configuration of hardware and software, as would be known to a person of ordinary skill in the art, may be utilized for the purposes stated supra in conjunction with the particular computer system 90 of FIG. 2. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for preventing redundant indexes in a database management system (DBMS), said method implemented by execution of the DBMS on a processor of a computer system that includes data storage media, said method comprising:

receiving a create-index command that specifies a new index to be created for retrieving data from a table created by the DBMS, wherein the create-index command specifies a redundancy check to be performed between a first set of keys for the new index at a second set of keys in each existing index in a set of existing indexes in conjunction with an action parameter in the create-index command, wherein the action parameter comprises a REPORT value or a PREVENT value, and wherein the storage media stores the table and an index database comprising the set of existing indexes, each existing index in the set of existing indexes being a data structure configured to retrieve data from the table;

responsive to receiving the create-index command, determining whether the creation of the new index will cause at least one redundant index to exist based on the first set of keys for the new index and the second set of keys in each existing index in the set of existing indexes, wherein the at least one redundant index is either the new index or at least one existing index in the set of existing indexes;

responsive to determining the existence of the at least one redundant index, ascertaining whether the action parameter comprises the REPORT value or the PREVENT value;

responsive to the action parameter comprising the REPORT value, storing and/or displaying an identification of the at least one redundant index, creating the new index, and incorporating the new index in the index database;

responsive to the action parameter comprising the PREVENT value and responsive to the at least one redundant index being redundant in view of the new index and the new index failing to be redundant in view of the at least one redundant index, deleting each existing index identified as the at least one redundant index from the index database, creating the new index, and incorporating the new index in the index database; and responsive to the action parameter comprising the PREVENT value and responsive to the at least one redundant index being redundant in view of each existing index in the set of existing indexes, inhibiting creation of the new index resulting the index database failing to comprise the new index.

2. The method of claim 1, wherein each existing index in the set of existing indexes is redundant in view of the new index and the new index is not redundant in view of each existing index in the set of existing indexes.

3. The method of claim 2, wherein the set of existing indexes comprises a plurality of existing indexes.

4. The method of claim 2, wherein the create-index command comprises a prompting requirement with respect to the PREVENT value, and wherein the method further comprises prior to the deleting, the creating, and the incorporating:

prompting a user for authorization to perform the deleting, the creating, and the incorporating; and responsive to receiving authorization, performing the deleting, the creating, and the incorporating.

5. The method of claim 1, wherein the new index is redundant in view of each existing index in the set of existing indexes.

6. The method of claim 5, wherein each existing index in the set of existing indexes fails to be redundant in view of the new index.

7. A computer program product, comprising a computer usable storage medium having a computer readable program code stored therein, the computer readable program code comprised by a database management system (DBMS) and containing instructions that when executed by a processor of a computer system implement a method for preventing redundant indexes in the DBMS, the computer system including data storage media, the method comprising:

receiving a create-index command that specifies a new index to be created for retrieving data from a table created by the DBMS, wherein the create-index command specifies a redundancy check to be performed between a first set of keys for the new index at a second set of keys in each existing index in a set of existing indexes in conjunction with an action parameter in the create-index command, wherein the action parameter comprises a REPORT value or a PREVENT value, and wherein the storage media stores the table and an index database comprising the set of existing indexes, each existing index in the set of existing indexes being a data structure configured to retrieve data from the table;

responsive to receiving the create-index command, determining whether the creation of the new index will cause at least one redundant index to exist based on the first set of keys for the new index and the second set of keys in each existing index in the set of existing indexes, wherein the at least one redundant index is either the new index or at least one existing index in the set of existing indexes;

responsive to determining the existence of the at least one redundant index, ascertaining whether the action parameter comprises the REPORT value or the PREVENT value;

responsive to the action parameter comprising the REPORT value, storing and/or displaying an identification of the at least one redundant index, creating the new index, and incorporating the new index in the index database;

responsive to the action parameter comprising the PREVENT value and responsive to the at least one redundant index being redundant in view of the new index and the new index failing to be redundant in view of the at least one redundant index, deleting each existing index identified as the at least one redundant index from the index database, creating the new index, and incorporating the new index in the index database; and responsive to the action parameter comprising the PREVENT value and responsive to the at least one redundant index being redundant in view of each existing index in the set of existing indexes, inhibiting creation of the new index resulting in the index database failing to comprise the new index.

8. The computer program product of claim 7, wherein each existing index in the set of existing indexes is redundant in view of the new index and the new index is not redundant in view of each existing index in the set of existing indexes.

9. The computer program product of claim 8, wherein the set of existing indexes comprises a plurality of existing indexes.

10. The computer program product of claim 8, wherein the computer readable program code further comprises instructions that when executed by the processor of the computer system implements:

prompting a user for authorization to perform the deleting, the creating, and the incorporating; and responsive to receiving authorization, performing the deleting, the creating, and the incorporating.

11. The computer program product of claim 7, wherein the new index is redundant in view of each existing index in the set of existing indexes, and wherein each existing index in the set of existing indexes fails to be redundant in view of the new index.

12. A computer system comprising a processor and a computer readable memory unit coupled to the processor, the memory unit containing computer readable program code comprised by a database management system (DBMS) and containing instructions that when executed by the processor of the computer system implement a method for preventing redundant indexes in the DBMS, the computer system including data storage media, said method comprising:

receiving a create-index command that specifies a new index to be created for retrieving data from a table created by the DBMS, wherein the create-index command specifies a redundancy check to be performed between a first set of keys for the new index at a second set of keys in each existing index in a set of existing indexes in conjunction with an action parameter in the create-index command, wherein the action parameter comprises a REPORT value or a PREVENT value, and wherein the storage media stores the table and an index database comprising the set of existing indexes, each existing index in the set of existing indexes being a data structure configured to retrieve data from the table;

responsive to receiving the create-index command, determining whether the creation of the new index will cause at least one redundant index to exist based on the first set of keys for the new index and the second set of keys in each existing index in the set of existing indexes, wherein the at least one redundant index is either the new index or at least one existing index in the set of existing indexes;

responsive to determining the existence of the at least one redundant index, ascertaining whether the action parameter comprises the REPORT value or the PREVENT value;

responsive to the action parameter comprising the REPORT value, storing and/or displaying an identification of the at least one redundant index, creating the new index, and incorporating the new index in the index database;

responsive to the action parameter comprising the PREVENT value and responsive to the at least one redundant index being redundant in view of the new index and the new index failing to be redundant in view of the at least one redundant index, deleting each existing index identified as the at least one redundant index from the index database, creating the new index, and incorporating the new in the index database; and responsive to the action parameter comprising the PREVENT value and responsive to the at least one redundant index being redundant in view of each existing index in the set of existing indexes, inhibiting creation of the new index resulting in the index database failing to comprise the new index.

13. The computer system of claim 12, wherein each existing index in the set of existing indexes is redundant in view of the new index and the new index is not redundant in view of each existing index in the set of existing indexes.

14. The computer system of claim 13, wherein the set of existing indexes comprises a plurality of existing indexes.

15. The computer system of claim 13, wherein the computer readable program code further comprises instructions that when executed by the processor of the computer system implements:
- prompting a user for authorization to perform the deleting, the creating, and the incorporating; and
- responsive to receiving authorization, performing the deleting, the creating, and the incorporating.

16. The computer system of claim 12, wherein the new index is redundant in view of each existing index in the set of existing indexes, and wherein each existing index in the set of existing indexes fails to be redundant in view of the new index.

* * * * *